US012578508B2

(12) United States Patent
Maury et al.

(10) Patent No.: US 12,578,508 B2
(45) Date of Patent: Mar. 17, 2026

(54) OPTICAL ARTICLE HAVING A MULTILAYERED ANTIREFLECTIVE COATING INCLUDING AN ENCAPSULATED METAL FILM

(71) Applicants: ESSILOR INTERNATIONAL, Charenton-le-pont (FR); CORPORATION DE L'ECOLE POLYTECHNIQUE DE MONTREAL, Montreal (CA)

(72) Inventors: Hélène Maury, Charenton-le-pont (FR); Antonin Riera, Montreal (CA); Bill Baloukas, Montreal (CA); Oleg Zabeida, Montreal (CA); Ludvik Martinu, Montreal (CA)

(73) Assignees: Essilor International, Charenton-le-Pont (FR); Corporation de l'Ecole Polytechnique de Montreal, Montreal (CA)

( * ) Notice: Subject to any disclaimer, the term of this patent is extended or adjusted under 35 U.S.C. 154(b) by 498 days.

(21) Appl. No.: 18/010,351

(22) PCT Filed: Jun. 17, 2021

(86) PCT No.: PCT/EP2021/066485

§ 371 (c)(1),
(2) Date: Dec. 14, 2022

(87) PCT Pub. No.: WO2021/255197

PCT Pub. Date: Dec. 23, 2021

(65) Prior Publication Data

US 2023/0266507 A1     Aug. 24, 2023

(30) Foreign Application Priority Data

Jun. 19, 2020    (EP) .................................... 20305678

(51) Int. Cl.
| | | |
|---|---|---|
| *G02B 1/115* | (2015.01) | |
| *C03C 17/30* | (2006.01) | |
| *C03C 17/36* | (2006.01) | |

(52) U.S. Cl.
CPC .............. *G02B 1/115* (2013.01); *C03C 17/30* (2013.01); *C03C 17/3657* (2013.01)

(58) Field of Classification Search
CPC ........ G02B 1/115; G02B 5/008; G02B 1/116; G02B 5/00; C03C 17/30; C03C 17/3657; C03C 17/36
See application file for complete search history.

(56) References Cited

U.S. PATENT DOCUMENTS

| | | | |
|---|---|---|---|
| 2009/0201583 A1* | 8/2009 | Kamada | C03C 17/007 359/485.02 |
| 2011/0111210 A1* | 5/2011 | Matsunami | C03C 17/008 428/328 |

(Continued)

FOREIGN PATENT DOCUMENTS

| | | |
|---|---|---|
| EP | 3203274 | 8/2017 |
| JP | 2006064991 | 3/2006 |

OTHER PUBLICATIONS

International Search Report and Written Opinion issued in Corresponding PCT Application No. PCT/EP2021/066485, dated Sep. 24, 2021.

*Primary Examiner* — Balram T Parbadia
(74) *Attorney, Agent, or Firm* — Norton Rose Fulbright US LLP

(57) ABSTRACT

This invention relates to an optical article comprising a transparent substrate with a front main face and with a rear main face, at least one of the main faces being coated with a multilayered antireflective coating comprising at least one low refractive index layer (LI) having a refractive index lower than 1.55 at 550 nm, named hereafter first LI layer, (Continued)

LI outermost layer

Another HI layer

First LI layer

L1

L2

First HI layer

MIL one first high refractive index layer (HI) having a refractive index higher than or equal to 1.55 at 550 nm, named hereafter the first HI layer, and one encapsulated metal film (EMF) comprising a metal island layer (MIL) that is encapsulated between a first layer (L1) and a second layer (L2), said first layer (L1) and said second layer (L2) being both composed of at least one dielectric material, characterized in that said —the first layer (L1) is a second LI layer having a refractive index lower than 1.55 at 550 nm and has a physical thickness equal to or higher than 10 nm, —the metal island layer (MIL) has plasmonic effects and has an effective thickness ranging from 0.2 nm to 4 nm, preferably ranging from 0.5 to 4 nm, —the second layer (L2) has a physical thickness equal to or higher than 10 nm, wherein said multilayered antireflective coating has a mean light reflection factor in the visible region Rv on the front face and/or on the rear face of said optical article that is equal to or lower than 2.5% for at least an angle of incidence lower than 35°, preferably for an angle of incidence of 0°. The absorption of said AR stack is mainly due to said MIL layer.

18 Claims, 1 Drawing Sheet

(56)     References Cited

U.S. PATENT DOCUMENTS

| 2015/0063748 A1* | 3/2015 | Zhang .................. H10F 77/484 |
| | | 385/28 |
| 2015/0321951 A1 | 11/2015 | Alzate et al. |
| 2017/0028676 A1 | 2/2017 | Yasuda et al. |
| 2018/0265403 A1* | 9/2018 | Kawahara ............... B32B 7/023 |
| 2020/0041703 A1* | 2/2020 | Yasuda ................... G02B 5/28 |
| 2020/0096785 A1* | 3/2020 | Sakai ................... C09D 175/04 |

* cited by examiner

OPTICAL ARTICLE HAVING A MULTILAYERED ANTIREFLECTIVE COATING INCLUDING AN ENCAPSULATED METAL FILM

CROSS-REFERENCE TO RELATED APPLICATIONS

This application is a national phase application under 35 U.S.C. § 371 of International Application No. PCT/EP2021/066485 filed 17 Jun. 2021, which claims priority to European Patent Application No. 20305678.3 filed 19 Jun. 2020. The entire contents of each of the above-referenced disclosures is specifically incorporated by reference herein without disclaimer.

1. FIELD OF THE INVENTION

The present invention relates to an optical article comprising a multilayered antireflective coating having coloration in transmission. The optical article may especially be an ophthalmic lens, such as a spectacle lens.

2. DESCRIPTION OF RELATED ART

An antireflection coating usually consists of a multilayer comprising interferential transparent thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

This antireflective coating is usually used in the ophthalmic field. Accordingly, traditional antireflective coatings are designed and optimized to reduce reflection on the lens surface in the visible region, typically within the spectrum range of from 380 to 780 nm. In general, the mean light reflection factor in the visible region $R_v$ on the front and/or rear faces of an ophthalmic lens is lower than 2.5%, more preferably between 0.4 to less than 2.5%, more preferably 0.5 to 1%.

In most cases, an antireflective coating presents a perceived residual reflected color that is, in addition linked to the perceived residual transmitted color. Especially, the residual color in transmission is complementary to the reflected one for clear lenses. In fact, it is not possible to break the dependence between residual colors in transmission and reflection with traditional antireflective coatings composed of transparent thin layers such as described above.

Hence, there is a need to provide a novel antireflective coating that is able to dissociate the reflected color in transmission and its complementary color in reflection.

Some solutions have been disclosed in the prior art.

For instance, an existing solution is the association of a colored lens substrate coated with an antireflective coating. The coloration of the substrate may be provided by pigments or additives that are included or sprayed into it.

Another solution consists in introducing into a multilayered antireflective coating a continuous metallic thin film, such as a continuous thin film made of silver (Ag), gold (Au)

or copper (Cu). However, such a solution does not offer the flexibility to customize the color in transmission and can result in an increase of yellowness and overall increase of absorption in the visible spectrum. This yellowness is esthetically unacceptable for many ophthalmic applications, and may interfere with the normal color perception of the user if the optical article is an ophthalmic lens.

Therefore, there is still a need to provide an antireflective coating for optical articles, especially ophthalmic lenses, having very good antireflective properties in the visible region, while having at the same time a customized color in transmission, versus the antireflective coatings of the prior art.

There is also a need to provide such an antireflective coating without preferably having an increase of yellowness (high value of b* according to the international colorimetric CIE L*a*b*).

3. SUMMARY OF THE INVENTION

An object of the invention is therefore to remedy the above drawbacks, by seeking to develop a transparent optical article, such as an ophthalmic lens and in particular a spectacle lens, comprising a substrate in mineral or organic material comprising at least one antireflective coating (AR coating). This antireflective coating possessing very good antireflective performances in the visible region, while having a customized coloration in transmission, and to do so without compromising the economic and/or industrial feasibility of its manufacture.

The invention therefore relates to an optical article comprising a transparent substrate with a front main face and with a rear main face, at least one of the main faces being coated with a multilayered antireflective coating comprising at least one low refractive index layer (LI) having a refractive index lower than 1.55 at 550 nm, at least one high refractive index layer (HI) having a refractive index higher than or equal to 1.55 at 550 nm and at least one encapsulated metal film (EMF) comprising a metal island layer (MIL) that is encapsulated between a first layer (L1) and a second layer (L2), said first layer (L1) and said second layer (L2) being both composed of identical or different dielectric materials, characterized in that the first layer (L1) has a refractive index lower than 1.55 at 550 nm and has a physical thickness equal to or higher than 10 nm, the metal island layer (MIL) has plasmonic effects and has an effective thickness ranging from 0.2 nm to 4 nm, preferably ranging from 0.5 to 4 nm, the second layer (L2) has a physical thickness equal to or higher than 10 nm, wherein said multilayered antireflective coating has a mean light reflection factor in the visible region $R_v$ on the front face and/or on the rear face of said optical article that is equal to or lower than 2.5% for at least an angle of incidence lower than 35°, preferably for an angle of incidence of 15° or 0°, and the absorption of the AR stack being mainly due to the MIL layer.

Therefore, the optical article according to the invention comprises a highly efficient antireflective (AR) coating that enables to dissociate the complementary color in reflection versus in transmission. In addition, and as it will be shown in the examples below, the antireflective coating of the invention enables to decrease the yellowness in transmission.

4. BRIEF DESCRIPTION OF THE DRAWING

The present invention will be described in more detail by referring to the appended drawings, wherein.

5. DETAILED DESCRIPTION OF THE INVENTION AND PREFERRED EMBODIMENTS

A°) Definitions

Figures 1, 2:
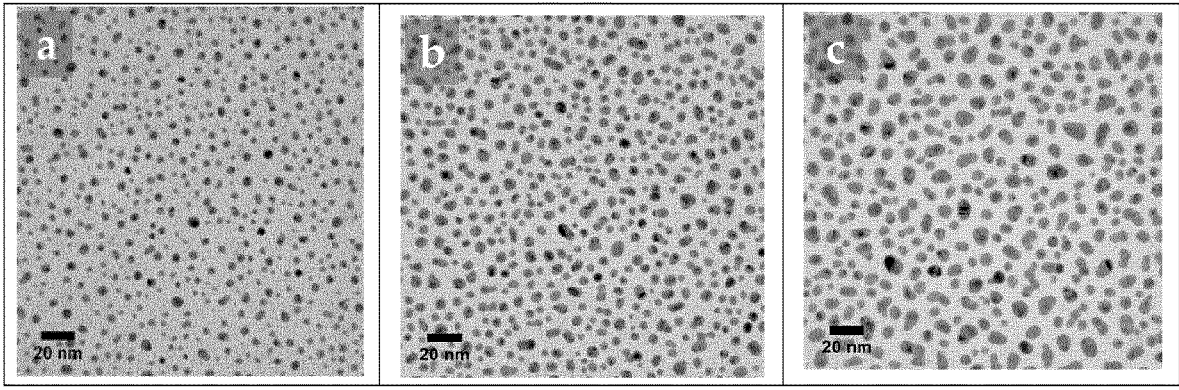
FIG. 1 shows TEM images of thin gold films on $Si_3N_4$ membranes coated with a $SiO_2$ passivation layer deposited at room temperature for a) 0.5 nm, b) 1.2 nm, c) 1.7 nm of effective thickness.
FIG. 2 is a scheme of an antireflective coating according to an embodiment of the invention comprising an encapsulated metal layer.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

Also unless otherwise indicated, the indication of an interval of values «from X to Y» or "between X to Y", according to the present invention, means as including the values of X and Y. In addition, unless otherwise indicated, for an interval of values, the expression "lower than X" or "higher than Y", does not comprise the value of X or Y.

The terms multilayered antireflective coating or AR coating and AR stack have the same meaning.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

By outermost layer of the multilayered antireflective coating, it is meant the layer of the anti-reflection (AR) coating which is the furthest from the substrate.

By innermost layer of the multilayered antireflective coating, it is meant the layer of the anti-reflection coating which is the closest to the substrate.

By inner layer of the multilayered antireflective coating, it is meant any layer of the anti-reflection coating except for the outermost layer of said AR coating.

Also, unless stated otherwise and except for the metal island layer (MIL), all thicknesses disclosed in the present application relate to physical thicknesses.

The metal islands have an average physical height.

On the final AR stack, the average height of the metal islands can be determined by measuring this height from the observation of a cross section of the stack (by TEM).

The effective thickness (ET) of the MIL is the mass equivalent thickness of the MIL, i.e. the thickness of a continuous film made of the same material as the individual islands having the same mass as the MIL for the surface covered by the MIL.

As the mass is distributed among individual islands, the island height will be higher than the ET.

The effective thickness can be calculated according to the following formula:

$$\text{Effective thickness} = \text{Surface area occupation factor} \times \text{island height} \times \text{a form factor.}$$

The surface area occupation factor is the total island projected area on a considered surface divided by the total surface under consideration.

The form factor depends on the exact shape of the islands, e.g.: 0.66 for hemispherical islands and 1.00 for cylindrical ones.

The surface coverage, island shape and island height can be estimated by transmission electron microscopy of the cross-section and top surface of a MIL (obtained by measuring a few hundred islands for a statistical evaluation).

Indeed, with these characteristics, it is then possible to calculate the total volume of material and thus the effective thickness of the MIL.

When the MIL is included in a stack, it is possible to etch the layers situated above and below the MIL using a focused ion beam to measure the total island projected area on the considered surface.

Unless otherwise specified, the refractive indexes referred to in the present application are expressed at 25° C. at a wavelength of 550 nm.

In the present application, a layer of the antireflective coating is said to be a layer with a high refractive index (HI) when its refractive index is higher than or equal to 1.55, preferably higher than or equal to 1.6, even more preferably higher than or equal to 1.90, such as 1.95 even more preferably higher than or equal to 2.00, such as 2.14.

A layer of the antireflective coating is said to be a low refractive index layer (LI) when its refractive index is lower than 1.55, preferably lower than or equal to 1.50, more preferably lower than or equal to 1.48. Said LI layer preferably has a refractive index higher than 1.1.

As used herein and except for the metal island layer (MIL), a layer of the antireflective coating is defined as having a thickness higher than or equal to 1 nm. Thus, any layer having a thickness lower than 1 nm will not be considered when counting the number of layers in the antireflective coating. A sub-layer such as described hereafter either is not considered when counting the number of layers of the antireflective coating.

The multilayered antireflective coating according to the invention may be formed on at least one of the main faces of a bare substrate, i.e. an uncoated substrate, or at least one of the main faces of the substrate already coated with one or more functional coatings, such as an anti-abrasion coating.

As used herein, the rear (or the inner or Concave or CC) face of the substrate is intended to mean the face which, when using the article, is the nearest from the wearer's eye. It is generally a concave face. On the contrary, the front face of the substrate (or Convex or CX), is the face which, when using the article, is the most distant from the wearer's eye. It is generally a convex face.

Also, as used herein, a "transparent substrate" is understood to be transparent, when the observation of an image through said substrate is perceived with no significant loss of contrast, that is, when the formation of an image through said substrate is obtained without adversely affecting the quality of the image.

According to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b* (1976). Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* (1976) (such as the Chroma C* and the hue "h") are calculated between 380 and 780 nm, taking the standard illuminant D65 and the observer into account (angle of 10°). The observer is a "standard observer" as defined in the international colorimetric system CIE L*a*b*. Indeed, in the CIE L*a*b* space, it is possible to express not only overall variations in color, but also in relation to one or more of the parameters L*, a* and b*. This can be used to define new parameters and to relate them to the attributes of the visual sensation. Clarity, related to luminosity, is directly represented by the value of L*. Chroma: $C^*=(a^{*2}+b^2)^{1/2}$. The angle of hue: h=tg−1 (b*/a*) (expressed in degrees); related to hue.

The transmission factor in the visible range τ$_v$, also called relative transmission factor in the visible range should be understood as defined by the international normalized definition (ISO 13666:1998 Standard) and is measured in accordance with the ISO 8980-3 Standard. It is defined in the wavelength range of from 380 to 780 nm.

In the present description, unless otherwise specified, transmittances/transmissions are measured at the center of the optical article for a thickness ranging from 0.7 to 2 mm, preferably from 0.8 to 1.5 mm, at an angle of incidence ranging from 0° to 15°, preferably 0° or 15°. As used herein, the light transmitted refers to light arriving on the front main face of the optical article and that went through the lens.

Herein, the "luminous reflectance" noted R$_v$, is such as defined in the ISO 13666:1998 Standard, and measured in accordance with the ISO 8980-4, i.e. this is the weighted spectral reflection average over the whole visible spectrum between 380 and 780 nm. R$_v$ is usually measured for an angle of incidence lower than 17°, typically of 15°, but can be evaluated for any angle of incidence.

B°) Optical Article

The optical article according to the present invention is a transparent optical article, preferably a lens or lens blank, and more preferably an ophthalmic lens or lens blank. The optical article may be coated on its convex main side (front side), concave main side (back side), or both sides with the multilayered antireflective coating of the invention.

B1°) The Substrate

Generally speaking, the interferential multilayered coating of the optical article according to the invention, which may be an antireflective coating (called hereafter AR coating), may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Preferably, the substrate and the optional abrasion-resistant coating and/or a scratch-resistant coating generally coated onto said substrate have a similar/close refractive index so as to avoid fringes or cosmetic defects.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

B2°) The Multilayered Antireflective Coating

The multilayered antireflective coating of the invention will be now described hereafter.

As previously mentioned, at least one of the main faces (front main face or rear main face), of the transparent substrate is coated with the multilayered antireflective coating (hereafter the AR coating) according to the invention.

This AR coating comprises at least one low refractive index layer (LI) having a refractive index lower than 1.55 at 550 nm, named hereafter first LI layer, at least one high refractive index layer (HI) having a refractive index higher than or equal to 1.55 at 550 nm, named hereafter the first HI layer, and at least one encapsulated metal film (EMF) comprising a metal island layer (MIL) that is encapsulated between a first layer (L1) and a second layer (L2), said first layer (L1) and said second layer (L2) being both composed of identical or different dielectric materials, characterized in that:

the first layer (L1) is a second LI layer having a refractive index lower than 1.55 at 550 nm and has a physical thickness equal to or higher than 10 nm, the metal island layer (MIL) has plasmonic effects and has an effective thickness ranging from 0.2 nm to 4 nm, preferably ranging from 0.5 to 4 nm, the second layer (L2) has a physical thickness equal to or higher than 10 nm, wherein said multilayered antireflective coating has a mean light reflection factor in the visible region $R_v$ on the front face and/or on the rear face of said optical article that is equal to or lower than 2.5% for at least an angle of incidence lower than 35°, preferably for an angle of incidence of 0°, better for an angle of incidence of 15°.

The absorption of said antireflective coating is mainly due to said MIL layer. This means that at least 50% of the reduction of transmission (Tv) caused by said antireflective coating is due to said MIL layer. Loss of transmission caused by said antireflective coating can be evaluated by comparison with an optical article without the antireflective coating.

The noble metal films such as gold, silver and copper tend to form on dielectric surfaces islands in their initial growth stage (Volmer-Weber growth). The size of these islands is such that the metals' free electrons are confined (mean free path of electrons is larger than the size of the islands), accumulate at the metal/dielectric interface (here, L1 and L2) when submitted to an electromagnetic wave and thus, form a dipole. This dipole resonates at a specific frequency (and hence wavelength) which is defined as the plasmonic resonance frequency (wavelength). In general, a metal island layer MIL having a few nanometers of effective thickness produces a high absorption in the visible spectrum which results in the generation of color.

Especially, the MIL supports the excitation of localized surface plasmon resonance (LSPR) in the visible spectrum. Indeed, at the wavelength corresponding to the resonance frequency, the coupling between the incoming light and the electron cloud is particularly intense. This causes a strong localized absorption of light, which is then converted into a collective electron oscillation (called a localized surface plasmon—LSP). The plasmon can also be reemitted, causing scattering.

Here, the Applicant developed a MIL of few nanometers of effective thickness that produces a selective absorption in the visible spectrum which results in the generation of a customized color.

Especially, the encapsulated metal film (EMF) of the invention is able to absorb a portion of the light within a selected wavelength range of the visible spectrum. In particular, the absorption of the AR coating of the invention is mainly due to said encapsulated metal film EMF and especially mainly due to the presence of the discontinuous metal island layer MIL.

For instance, at least 50% or 85%, preferably at least 90% and typically at least 95%, such as 98% of the absorption (or alternatively, reduction of transmission Tv) of the AR coating in the visible region is due to said EMF or MIL.

Indeed, according to an embodiment of the invention, the AR coating does not comprise a continuous metal layer. According to another embodiment of the invention, the AR coating does not comprise another encapsulated metal film (EMF) with a metal island layer.

In addition, to satisfy the constraints in the ophthalmic field (e.g. requirement o high Tv), the Applicant has developed an encapsulated metal film EMF comprising a MIL that helps to reduce the reflection in the visible region, but mainly that enables to correct the color of the produced AR coating in transmission.

In addition, the Applicant has discovered that the MIL of the invention possesses optical constants which differ quite significantly from their continuous counterparts (e.g. continuous metal layer). Especially, contrarily to using these continuous metal layers to realize the AR coating, it has been shown that the selective-absorption of the MILs of the invention enables to maintain the transmission at a higher value.

Indeed, as it will be shown in the examples below, the antireflective coating according to the invention enables to obtain a low reflectance ($R_v \le 0.8\%$ at an angle of incidence of 15°), a high transmission ($Tv \ge 83\%$ at an angle of incidence of 15° and at the same time, a customized color in transmission with few or no yellowness (relative low value of b*).

Especially, the customized color in transmission of the AR coating of the invention may be controlled according to the characteristics of the encapsulated metal film EML. Indeed, the Applicant has discovered that the colorimetric parameters of the color transmitted by the AR coating of the invention, such as the hue "h", the saturation in color (Chroma C*) and the brightness may be modified/controlled by the plasmonic resonance characteristics and therefore by the design of the EML according to the invention.

As previously mentioned and as shown on FIG. 2, the EML according to the invention comprises and preferably is constituted of a metal island layer (MIL) that is encapsulated between a first layer (L1) and a second layer (L2), said first layer (L1) and said second layer (L2) being both composed of at least one dielectric material.

As shown on FIG. 2, the islands are overcoated by the layer L1 and that the top L2 layer contacts the bottom L1 layer. Of course, if L1 is very thin and depending on the height of the islands, the L1 layer will not be as flat as illustrated on FIG. 2 and will follow the islands' shape.

Preferably, the metal of said metal island layer (MIL) is selected from: silver (Ag), gold (Au) or copper (Cu) or mixtures thereof.

According to the invention, the metal island layer (MIL) has an effective thickness (ET) such as defined above that ranges from 0.2 nm to 4 nm, preferably ranges from 0.5 to 4 nm. Generally, the effective thickness of said metal island layer (MIL) ranges from 0.3 nm to 3 nm, preferably ranges from 1 to 2 nm.

Here, an effective thickness ranges "from 0.2 nm to 4 nm" includes the following values and/or any intervals comprised between these values (limits included): 0.2; 0.3; 0.4; 0.5; 0.6; 0.7; 0.8; 0.9; 0.10; 0.11; 0.12; 0.15; 0.20; 0.25; 0.30; 0.35; 0.40; 0.45; 0.50; 0.55; 0.60; 0.65; 0.70; 0.75; 0.80; 0.90; 0.95; 1.0; 1.05; 1.10; 1.15; 1.20; 1.25; 1.30; 1.35; 1.40; 1.45; 1.50; 1.55; 1.60; 1.65; 1.70; 1.75; 1.80; 1.85; 1.90;

2.00; 2.10; 1.20; 2.30; 2.40; 2; 50; 2.60; 2.70; 2.80; 2.90; 3.00; 3.10; 3.20; 3.40; 3.50; 3.60; 3.70; 3.80; 3.90; 4.00.

For instance, the calculation of the effective thickness may be as follows:

If the islands have a hemispherical shape such as shown on FIG. 1a, we obtain, for a surface occupation factor of 17% and an island height=4.4 nm (thus a diameter of 8.8 nm):

$$ET=\tfrac{2}{3}\times \text{Surface area occupation factor}\times \text{island height.}$$

$$ET=\tfrac{2}{3}\times 0.17\times 4.4=0.5 \text{ nm}$$

Also, for the islands as shown on FIG. 1c, for a measured island height of 4.6 nm and a surface occupation factor of 55% we obtain therefore, ET=1.7 nm.

According to a characteristic of the invention and as shown on FIG. 1 or on FIG. 2, the MIL is composed or constituted of nanoislands of the above-mentioned metal having spherical, ellipsoidal, or other shapes.

Preferably, the nanoislands have a uniform shape and especially have a spherical shape (see FIG. 1).

According to this embodiment, the nanoislands have in general a size (or a diameter) which ranges from 1 to 50 nm, preferably ranges from 3 to 30 nm and typically ranges from 3 to 15 nm. Herein, by "size", we mean the diameter of the nanoislands or the longest distance within the nanoislands.

In fact, nanoislands having a uniform spherical shape and a small size distribution, such as having a size less than 50 nm enable to generate a well-defined absorption peak, especially for a MIL having an effective thickness equal to of lower than 1.5 nm. Indeed, for a MIL having a higher effective thickness (such as 2.3 nm), the absorption peak in the visible region is often wider and red shifted due to the worm-like nature of the islands.

For instance, the density of the nanoislands according to the invention is typically determined through SEM or TEM imaging Also, generally, the surface area occupation factor of this MIL is in the range of from 10% to 98%, preferably 17% to 75%, preferably from 53% to 70%, and typically from 63% to 70%.

Here, an occupation factor of the MIL ranges "from 10% to 83" includes the following values and/or any intervals comprised between these values (limits included): 10; 11; 15; 18; 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50; 51, 52, 53, 54, 55, 56, 57, 58, 59; 60; 61; 62 63; 64; 65; 66; 67; 68; 69 70; 71; 72; 73; 74; 75%.

Preferably, the surface area occupation factor (or covering) of this MIL is low and is in the range from 10% to 80%, preferably from 15% to 70%. Indeed, the Applicant has discovered that a low surface area occupation factor (or low coverage) enables to enhance the adhesion between the layer L1 and the layer L2.

According to the invention "an occupation factor of the MIL" means the proportion of the surface of the layer that is situated just under the MIL (here, in general L2 as mentioned above) and that is covered by the MIL.

In addition, the Applicant has also discovered that the two layers L1 and L2 that encapsulate the MIL have an impact on the localized surface Plasmon resonance of the MIL.

Especially, it has been shown that L1 and L2 should be thick enough to cover the MIL and also to limit the impact of additional dielectric layers added below or above the EML (e.g. the at least one first LI layer and the at least one first HI layer).

Hence, according to the invention, the first layer (L1) is a second LI layer having a refractive index lower than 1.55 at 550 nm and has a physical thickness equal to or higher than 10 nm, whereas the second layer (L2) has a physical thickness equal to or higher than 10 nm.

According to a characteristic of the invention, the physical thickness of said first layer L1 ranges from 10 nm to 100 nm, preferably ranges from 15 nm to 50 nm.

According to another characteristic of the invention, the physical thickness of said second layer L2 ranges from 10 nm to 100 nm, preferably ranges from 15 nm to 50 nm.

Especially, the physical thickness of the layer L1 is similar to the one of the layer L2.

In general, the first layer, that is a LI layer (e.g. has refractive index lower than 1.55 at 550 nm) comprises one or more dielectric materials selected from: silicon oxide ($SiO_x$ with $1.3 < x \le 2$), $MgF_2$ and is preferably silicon dioxide ($SiO_2$).

The second layer L2 may be a LI layer or a HI layer. If the second layer L2 is a LI layer, it may comprise one or more dielectric materials selected from: silicon oxide ($SiO_x$ with $1.3 < x \le 2$), $MgF_2$ and is preferably silicon dioxide ($SiO_2$), whereas if the second layer L2 is a HI layer, it may comprise one or more dielectric materials selected from zirconia ($ZrO_2$), titanium dioxide ($TiO_2$), or tantalum pentoxide ($Ta_2O_5$).

In general, the encapsulated metal film EMF of the invention comprises in the following order and in the direction moving away from said transparent substrate: the second layer (L2)/the metal island layer (MIL)/the first layer (L1). Indeed, generally, the MIL is coated onto the second layer L2.

Especially, according to the invention, the layer L1, the MIL and the layer L2 are in direct contact, e.g. the MIL coated directly the layer L2 and is itself coated by the layer L1 (encapsulation).

As previously mentioned, the AR coating of the invention comprises, in addition of the EML, that is to say below or above said EML, at least one LI layer, named hereafter "first LI layer" and at least one HI layer, named hereafter "first HI layer".

Indeed, the AR coating comprises, in addition of the EML, at least one layer, preferably two layers and typically three layers with a low refractive index (LI), and at least one layer, preferably two layers and typically three layers with a high refractive index layer (HI). It is here a simple stack, since the layer total number in the antireflective coating (without the EML) is higher than or equal to 2 and in general lower than or equal to 12.

HI layers and LI layers (in addition of the EML) don't need to alternate with each other in the stack, although they also may, according to one embodiment of the invention. Two HI layers (or more) may be deposited onto each other, as well as two LI layers (or more) may be deposited onto each other. In general, the HI layers and LI layers alternate with each other in the stack of the AR coating according to the invention. Especially, the HI layers and LI layers alternate with each other in the stack of the AR coating according and are placed below the EML and/or above the EML.

According to a characteristic of the invention, the outermost layer of the AR coating is the first LI layer. In general, said outermost layer has a physical thickness equal to or higher than 50 nm, preferably equal to or higher than 60 nm and typically ranges from 60 to 150 nm.

According to another characteristic of the invention, the layer of the AR coating that is the nearest from substrate is the second layer (L2) of the encapsulated metal film (EMF) or the first HI layer.

According to a first embodiment of the invention the multilayered antireflective coating may comprise, in the direction moving away from the substrate, the first HI layer with a physical thickness lower than or equal to 30 nm, preferably ranging from 5 to 30 nm, more preferably ranging from 5 to 11 nm;

a LI layer having a physical thickness ranging from 30 to 60 nm, more preferably ranging from 40 to 50 nm;

the L2 layer, that is preferably a HI layer, having a physical thickness ranging from 10 to 30 nm, more preferably ranging from 12 to 20 nm;

the MIL layer having an effective thickness ranging from 0.5 to 4 nm, more preferably ranging from 0.5 to 2 nm;

the LI layer having a physical thickness ranging from 10 to 30 nm, more preferably ranging from 10 to 20 nm;

a HI layer having a physical thickness lower than or equal to 30 nm, preferably ranging from 5 to 30 nm, more preferably ranging from 5 to 12 nm;

the first LI layer, also named outermost LI layer, having a physical thickness higher than 60 nm, ranging from 70 to 150 nm, more preferably ranging from 75 to 90 nm.

According to a second embodiment of the invention the multilayered antireflective coating may comprise, in the direction moving away from the substrate, the first HI layer with a physical thickness lower than or equal to 50 nm, preferably ranging from 5 to 50 nm, more preferably ranging from 20 to 30 nm;

a LI layer having a physical thickness ranging from 30 to 70 nm, more preferably ranging from 40 to 60 nm;

a HI layer having a physical thickness higher than or equal to 20 nm, preferably ranging from 30 to 60 nm, more preferably ranging from 40 to 50 nm the L2 layer, that is a LI layer, having a physical thickness ranging from 10 to 30 nm, more preferably ranging from 12 to 20 nm;

the MIL layer having an effective thickness equivalent ranging from 0.5 to 4 nm, more preferably ranging from 1 to 3 nm;

the L1 layer having a physical thickness ranging from 10 to 30 nm, more preferably ranging from 10 to 20 nm;

a HI layer having a physical thickness lower than or equal to 30 nm, preferably ranging from 5 to 30 nm, more preferably ranging from 5 to 18 nm;

the first LI layer, also named outermost LI layer, having a physical thickness higher than 40 nm, ranging from 40 to 150 nm, more preferably ranging from 50 to 70 nm.

According to a third embodiment of the invention the multilayered antireflective coating may comprise, in the direction moving away from the substrate, the first HI layer with a physical thickness lower than or equal to 50 nm, preferably ranging from 5 to 50 nm, more preferably ranging from 5 to 15 nm;

the L2 layer, that is a LI layer, having a physical thickness ranging from 10 to 30 nm, more preferably ranging from 12 to 20 nm;

the MIL layer having an effective thickness equivalent ranging from 0.5 to 4 nm, more preferably ranging from 3 to 4 nm;

the L1 layer (LI layer) having a physical thickness ranging from 10 to 30 nm, more preferably ranging from 10 to 20 nm;

the first LI layer, also named outermost LI layer, having a physical thickness higher than 60 nm, ranging from 70 to 150 nm, more preferably ranging from 75 to 90 nm.

Advantageously, the at least one HI layers that are not comprised into said encapsulated metal film (EMF) comprise one or more metal oxides selected from: zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), titanium dioxide ($TiO_2$) and mixtures thereof. The preferred materials include zirconia ($ZrO_2$), tantalum pentoxide ($Ta_2O_5$). Optionally, the HI layers may further contain silica or other materials with a low refractive index, provided they have a refractive index higher than or equal to 1.6 as indicated hereabove.

Also, preferably, the at least one LI layers that are not comprised into said encapsulated metal film (EMF) are also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$). Optionally, the LI layers may further contain materials with a high refractive index or very high refractive index, provided the refractive index of the resulting layer is lower than to 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

Generally, the layer total number in the AR coating (with the EML) is higher than or equal to 5, more preferably higher than or equal to 6, typically higher than or equal to 7, in particular higher than or equal to 8.

In particular, the layer total number in the antireflective coating (with the EML) is lower than or equal to 11, more preferably lower than or equal to 10, even more preferably lower than or equal to 9, and most preferably equal to or lower than 8 layers.

Preferably, the antireflective coating total thickness (e.g. with the EML) is lower than or equal to 450 nm, more preferably lower than or equal to 350 nm and even more preferably lower than or equal to 250 nm. The antireflective coating total thickness is generally higher than 50 nm, preferably higher than or equal to 100 nm. Typically, the physical thickness of said antireflective coating is ranging from 100 to 250 nm.

As used herein, an interval lower than or equal to 450 nm includes the following values and/or any intervals comprised between these values (limits included): 450; 440; 430; 420; 410; 400; 390; 380; 370; 360; 350; 340; 330; 320; 310; 300; 250; 230; 220; 210; 200; 190; 180; 170; 160; 150; 140; 130; 120; 110; 105; 100; 95; 90; 85; 80; 75; 70; 65; 60; 55; 50 etc.

According to another characteristic of the invention, the AR coating may comprise an antistatic layer (also named electrically conductive layer).

Indeed, the optical article of the invention may be made antistatic that is to say not to retain and/or develop a substantial static charge, by incorporating at least one electrically conductive layer into the stack present on the surface of the article.

The ability for a material to evacuate a static charge obtained after rubbing with a piece of cloth or using any other procedure to generate a static charge (charge applied by corona . . . ) may be quantified by measuring the time it takes for said charge to dissipate. Thus, antistatic materials have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the antireflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating: e.g. the "LI outer layer" or the "LI outermost layer".

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtain antireflective properties and represents a layer with a high refractive index in the antireflective coating. This is the case for those layers made from an electrically conductive and highly transparent material such as ITO layers.

Preferably, the antireflective coating does not comprise any layer with a thickness higher than or equal to 20 nm, more preferably higher than 15 nm, based on indium oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

Hence, the present invention provides an antireflective coating with an improved conception, comprising a relatively thin stack made of layers, the thicknesses and materials of which have been selected so as to obtain satisfactory antireflective performances and a customized color in transmission.

Preferably, the residual reflected light from said multilayered antireflective coating has a Chroma C*, as defined in the colorimetric CIE L*a*b* and for an angle of incidence (θ) of 30° or of 15° equal to or higher than 9, preferably equal to or higher than 14.

Generally, the optical article is an ophthalmic lens, such as a spectacle lens. The antireflective coatings of the front face and of the rear face may be preferably different.

In an embodiment of the invention, the rear main face and the front main face of the optical article are coated with identical or different multilayered antireflective coatings according to the invention. According to another embodiment, the front face of the ophthalmic lens of the invention is coated with the antireflective coating described above. In another embodiment, the rear face of the ophthalmic lens of the invention is coated with a conventional antireflective coating.

In one embodiment, the ophthalmic lens according to the invention does not absorb not much in the visible, which means, in the context of the present application, that its transmission factor in the visible range $\tau_v$, also called relative transmission factor in the visible range, is higher than 75%, more preferably higher than 80%, even more preferably higher than 85%.

B3°) Sub-Layer

In one embodiment of the present invention, the antireflective coating may be deposited onto a sub-layer. It should be noted that such sub-layer does not belong to the antireflective coating.

As used herein, a sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate).

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor Tv. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 600 nm, more preferably lower than 500 nm, and is generally higher than 90 nm, more preferably higher than 100 nm, and even better higher than 150 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

A sub-layer of the monolayer type will be preferably used. However, the sub-layer may be laminated (multilayered), especially when the sub-layer and the underlying substrate have a substantially different refractive index. This applies especially when the underlying substrate, has a high refractive index, i.e. a refractive index higher than or equal to 1.55, preferably higher than or equal to 1.57.

In this case, the sub-layer may comprise, in addition to a 90-400 nm-thick layer, called the main layer, preferably at most three additional layers, more preferably at most two additional layers, interleaved between the optionally coated substrate and such 90-400 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

According to an embodiment, the antireflective coating is not deposited onto a sub-layer such as described above.

B4°) Process

The various layers of the antireflective coating (except the MIL) and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating (except the MIL) and of the optional sub-layer is conducted by evaporation under vacuum, under classical conditions known by the man skilled in the art, such as described, for example in EP2122392 or EP2411850 or WO2012076714.

The deposition process of the EML will be now described Especially, the manufacture of the EML comprises the following successive steps the deposition of the Layer L2 for instance with the techniques mentioned above;

the deposition of the MIL layer; and the deposition of the layer L1 for instance with the techniques mentioned above In particular, the deposition of the MIL layer may be done by evaporation or sputtering.

As mentioned above, the noble metals (Ag, Au and Cu) generally present a 3D growth mode (islands growth) on dielectric surfaces. The energy of the incoming atoms, the surface temperature of the substrate and the deposition rate (power and pressure) are all parameters that influence the growth dynamics by affecting the diffusion length of the adatoms. This length dictates several properties such as the density of islands (average distance between each island), their size and their shape.

Hence, the surface temperature of the substrate preferably ranges from 20 to 300° C. and in particular ranges from 20 to 100° C. Indeed, during depositions at room temperature, the low surface mobility causes incomplete coalescence when two islands meet resulting in an ellipsoidal shape. Depositions at higher temperatures or after subsequent annealing help recrystallize the islands, allowing for a complete coalescence. Thus, it has been shown that the addition of surface heating during deposition is contributing to promote the formation of a MIL with the desired plasmonic properties (intense and narrow absorption).

The polymer substrates cannot be subjected in general to temperatures above 120° C.

Indeed, with deposition techniques such as magnetron sputtering, the size and density of the islands thus obtained are closely related. Indeed, according to a simple growth kinetics model, the density of islands, N, is related to the incoming vapor flux F, but also to the diffusion length, $D_0$, according to $N \propto (F/D_0)^{1/3}$, where the diffusion length Do depends on the surface temperature of the substrate.

A longer diffusion length Do therefore results, for a given flux, in a lower density of islands. The islands may thus reach a larger size before the film percolates in comparison to a film deposited at a lower temperature or at a higher deposition rate.

In short, to obtain the desired density/island size, it is preferable to play with these two deposition parameters.

B5°) Other Functional Layers

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5 μm.

The ophthalmic lens according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an ophthalmic lens according to the invention comprises a substrate that is successively coated on its rear face with an impact-resistant primer layer, an anti-abrasion and scratch-resistant layer, an anti-UV, antireflective coating and with a hydrophobic and/or oleophobic coating, or with a hydrophilic coating which provides antifog properties, or an antifog precursor coating.

The front face of the substrate of the ophthalmic lens may be successively coated with an impact-resistant primer layer, an abrasion-resistant layer and/or a scratch-resistant layer, an antireflective coating according to the invention, and with a hydrophobic and/or oleophobic coating.

The ophthalmic lens according to the invention is preferably spectacle lens, or a blank for spectacle lens. The lens may be a polarized lens, a photochromic lens or a solar lens, which may be tinted or not, be corrective, or not.

The following examples illustrate the present invention in a more detailed, but non-limiting manner.

6. EXAMPLES

A) General Procedures

The optical articles according to the invention comprise a lens substrate, having a 65 mm diameter, a refractive index of 1.50 (ORMA® lens from ESSILOR) and a power of −2.00 diopters and a center thickness of 1.2 mm, coated on its front and rear faces with the following anti-abrasion and scratch-resistant coating.

The anti-abrasion and scratch-resistant coating disclosed in Example 3 of the patent EP 0 614 957 (refractive index equal to 1.47 and thickness of 3.5 μm), based on a hydrolyzate composed of GLYMO and DMDES, of colloidal silica and aluminium acetylacetonate is deposited on the substrate.

Said anti-abrasion and scratch-resistant coating can be obtained by depositing and hardening a composition comprising by weight, 224 parts of GLYMO, 80.5 parts of HCl 0.1 N, 120 parts of DMDES, 718 parts of 30% by weight colloidal silica in methanol, 15 parts of aluminium acetylacetonate and 44 parts of ethylcellosolve. The composition also contained 0.1% of surfactant FLUORAD™ FC-430® manufactured by 3M, by weight relative to the composition total weight.

The anti-abrasion and scratch-resistant coating described above has a refractive index about 1.5 (hereinafter HC1.5) and is used for substrates having a refractive index of 1.5.

The layers of the antireflective coating (except MIL) can be deposited onto the front face of the tested lenses without heating the substrates by evaporation under vacuum (evaporation source: electron gun).

The deposition frame is typically a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

Typical Deposition Process for the EMF:

The EMF (L2/MIL/L1) stack is deposited on the substrates, ultrasonically cleaned using an alkaline solution, then bathed in isopropanol, rinsed with distilled water, and finally dried with nitrogen. Before deposition, the surface was also exposed to a plasma of argon/oxygen (2:1 flow ratio) with a RF-bias of −100 V for 5 minutes. All depositions were performed using a radiofrequency (RF) power supply and the base pressure was typically of $2 \times 10^{-6}$ Torr. The MIL was deposited by sputtering from a 5 cm gold target (99.99%) in an Ar (99.999%) atmosphere at a pressure of 6 mTorr and a power of 25 W (deposition rate of about 0.4 Å/s, verified for each experiment).

For example 1, the L1 layer is a $SiO_2$ layer which was deposited in an argon and oxygen (99.999%) containing atmosphere (5:1 flow ratio) at a pressure of 5 mTorr (0.21 Å/s) from a $SiO_2$ target (99.995%) at 150 W of RF power whereas the L2 layer is titania ($TiO_2$) layer which was deposited from a titanium target (99.99%) via reactive sputtering at 0.40 Å/s. The effective thickness of the MIL was controlled by means of a quartz crystal microbalance (QCM).

For examples 2 and 3 the L1 and L2 layer are all $SiO_2$ layers deposited as described before.

The effective thickness of the MIL was determined as described above by means of a QCM calibrated using ex situ optical characterization of a thicker continuous gold film by a combination of spectrophotometry—transmission and reflection (Cary 7000 spectrophotometer with Universal Measurement Accessory)—and spectroscopic ellipsometry (RC2-XI from J.A. Woollam Co., Inc.). The same optical characterization equipment was used to establish the optical properties of the resulting EMF.

The optical parameters $R_v$, $C^*$, $h^\circ$ have been determined in reflection at an angle of incidence of $15^\circ$ and the optical parameters $a^*$, $b^*$ and Tv have been determined in transmission at an angle of incidence of $0^\circ$.

B) Test Procedure

The method for making optical articles comprises the step of introducing the substrate, coated with the anti-abrasion and scratch-resistant coating, into a vacuum deposition chamber, a step of pumping until a high-vacuum is obtained, a step of activating the front face of the substrate by means of an argon ion beam (anode current: 1 A, anode voltage: 100 V, neutralization current: 130 mA), turning the ion irradiation off, forming the various layers of the antireflective coating by successive evaporations such as explained above on the front face and last a ventilation step.

Traditional AR coatings have been deposited such as described above (evaporation under vacuum).

C) Results

C1. Case of an Orange Antireflective Coating (Example 1)

The example 1 is compared to Counter-example 1 composed of pure $SiO_2/ZrO_2$ (transparent dielectric materials). The two stacks present the same colorimetric properties in reflection ($Rv$, $C^*$ and $h^\circ$):

TABLE 1

| Structure | Lens 1 (invention) | | Counter-example 1 |
|---|---|---|---|
| | $SiO_2$ | 83 nm $SiO_2$ | 90 nm |
| | $TiO_2$ | 10 nm $ZrO_2$ | 57 nm |
| | $SiO_2$ | 16 nm $SiO_2$ | 36 nm |
| | Au | 1.25 nm $ZrO_2$ | 22 nm |
| | $TiO_2$ | 16 nm | |
| | $SiO_2$ | 44 nm | |
| | $TiO_2$ | 9 nm | |
| | | substrate | |
| Results (reflection) | | | |
| Rv (%) | 0.62 | | 0.63 |
| C* | 9 | | 9 |
| h° | 44 | | 44 |
| Results (transmission) | | | |
| a* | −2.2 | | −0.3 |
| b* | −2.0 | | −0.2 |
| Tv (%) | 90 | | 99 |

Hence, for the same color in reflection, Lens 1 according to the invention enables to obtain a more pronounced color in transmission. Therefore, the color in transmission has been dissociated from the color in reflection.

C2. Case of a Green Antireflective Coating (Example 2)

The example 2 is compared to Counter-example 2 composed of pure $SiO_2/ZrO_2$ (transparent dielectric materials). The two stacks present the same colorimetric properties in reflection:

TABLE 2

| Structure | Lens 2 (invention) | | Counter-example 2 |
|---|---|---|---|
| | $SiO_2$ | 60 nm $SiO_2$ | 84 nm |
| | $ZrO_2$ | 12 nm $ZrO_2$ | 72 nm |
| | $SiO_2$ | 16 nm $SiO_2$ | 23 nm |
| | Au | 2.5 nm $ZrO_2$ | 28 nm |

TABLE 2-continued

| Structure | Lens 2 (invention) | | Counter-example 2 |
|---|---|---|---|
| | $SiO_2$ | 16 nm | |
| | $ZrO_2$ | 39 nm | |
| | $SiO_2$ | 50 nm | |
| | $ZrO_2$ | 24 nm | |
| | | substrate | |
| Results (reflection) | | | |
| Rv (%) | 0.8 | | 0.8 |
| C* | 9 | | 9 |
| h° | 135 | | 135 |
| Results (transmission) | | | |
| a* | −3.2 | | 0.3 |
| b* | −4.5 | | −0.2 |
| Tv (%) | 83 | | 99 |

Hence, for the same color in reflection, Lens 2 according to the invention enables to obtain a more pronounced color in transmission. Therefore, the color in transmission has been dissociated from the color in reflection.

C3. Case of a Blue Antireflective Coating (Example 3)

The example 3 is compared to Counter-example 3 composed of pure $SiO_2/ZrO_2$ (transparent dielectric materials). The two stacks present the same colorimetric properties in reflection:

TABLE 3

| Structure | Lens 3 (invention) | | Counter-example 3 |
|---|---|---|---|
| | $SiO_2$ | 60 nm $SiO_2$ | 84 nm |
| | $SiO_2$ | 84 nm $ZrO_2$ | 96 nm |
| | $SiO_2$ | 16 nm $SiO_2$ | 34 nm |
| | Au | 3.75 nm $ZrO_2$ | 34 nm |
| | $SiO_2$ | 16 nm $SiO_2$ | 27 nm |
| | $ZrO_2$ | 8 nm | |
| | | substrate | |
| Results (reflection) | | | |
| Rv (%) | 0.78 | | 0.78 |
| C* | 14 | | 14 |
| h° | 260 | | 260 |
| Results (transmission) | | | |
| a* | −.3.1 | | 0.2 |
| b* | −0.7 | | 0.7 |
| Tv (%) | 82 | | 99 |

Hence, for the same color in reflection, Lens 3 according to the invention enables to obtain a more pronounced color in transmission. Therefore, the color in transmission has been dissociated from the color in reflection.

The invention claimed is:

1. An optical article comprising a transparent substrate with a front main face and with a rear main face, at least one of the main faces being coated with a multilayered antireflective coating comprising at least one low refractive index layer (LI) having a refractive index lower than 1.55 at 550 nm, named hereafter first LI layer, at least one high refractive index layer (HI) having a refractive index higher than or equal to 1.55 at 550 nm, named hereafter first HI layer, and at least one encapsulated metal film (EMF) comprising a metal island layer (MIL) that is encapsulated between a first layer (L1) and a second layer (L2), said first layer (L1) and said second layer (L2) being both composed of identical or different dielectric materials, wherein: the first layer (L1) is a second LI layer having a refractive index lower than 1.55 at 550 nm and has a physical thickness equal to or higher than 10 nm; the metal island layer (MIL) has plasmonic effects and has an effective thickness ranging from 0.2 nm to 4 nm; and the second layer (L2) has a physical thickness equal to or higher than 10 nm; wherein said multilayered antireflective coating imparts to the optical article a mean light reflection factor in the visible region Rv that is equal to or lower than 2.5% for at least an angle of incidence lower than 35° and the absorption of said antireflective coating is mainly due to said MIL layer; and wherein said first LI layer, said first HI layer, said first second L1 layer, said second L2 layer, and said MIL layer are distinct layers; wherein said encapsulated metal film comprises in the following order in a direction moving away from said transparent substrate: the second layer (L2)/the metal island layer (MIL)/the first layer (L1); wherein the outermost layer of the multilayered antireflective coating is the first LI layer; and wherein the layer of the multilayered antireflective coating that is nearest the substrate is the second layer (L2) of the encapsulated metal film (EMF) or the first HI layer.

2. The optical article of claim 1, wherein the metal island layer (MIL) has an effective thickness ranging from 0.5 to 4 nm.

3. The optical article of claim 1, wherein said first layer (L1) comprises one or more dielectric materials further defined as silicon oxide $SiO_x$ with $1.3<x\leq2$, $MgF_2$.

4. The optical article of claim 3, wherein said first layer (L1) is composed of silicon dioxide ($SiO_2$).

5. The optical article of claim 1, wherein said second layer (L2) comprises one or more dielectric materials further defined as silicon oxide $SiO_x$ with $1.3<x\leq2$, zirconia ($ZrO_2$), titanium dioxide ($TiO_2$), and/or tantalum pentoxide ($Ta_2O_5$).

6. The optical article of claim 5, wherein said second layer (L2) is composed of silicon dioxide ($SiO_2$).

7. The optical article of claim 1, wherein the physical thickness of said first layer (L1) ranges from 10 nm to 100 nm.

8. The optical article of claim 7, wherein the physical thickness of said first layer (L1) ranges from 15 nm to 50 nm.

9. The optical article of claim 1, wherein the physical thickness of said second layer (L2) ranges from 10 nm to 100 nm.

10. The optical article of claim 9, wherein the physical thickness of said second layer (L2) ranges from 15 nm to 50 nm.

11. The optical article of claim 1, wherein the metal of said metal island layer (MIL) is silver (Ag), gold (Au), copper (Cu) or a mixture thereof.

12. The optical article of claim 1, wherein the effective thickness of said metal island layer (MIL) ranges from 0.3 nm to 3 nm.

13. The optical article of claim 12, wherein the effective thickness of said metal island layer (MIL) ranges from 1 to 2 nm.

14. The optical article of claim 1, wherein said metal island layer (MIL) has a surface area occupation factor in the range of from 20% to 98%.

15. The optical article of claim 1, wherein said at least one first HI layer comprises one or more metal or metalloid oxide further defined as zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$), silica ($SiO_x$), and/or silicon nitrides ($Si_3N_4$).

16. The optical article of claim 1, wherein said at least one first LI layer comprises one or more metal or metalloid oxides further defined as $SiO_2$ or a mixture of silica and alumina.

17. The optical article of claim 1, wherein the luminous transmittance (Tv) in the visible spectrum through said optical article is higher than 75%.

18. The optical article of claim 1, wherein the rear main face and the front main face of the optical article are both coated with identical or different multilayered antireflective coatings.

* * * * *